Patented Dec. 29, 1931

1,838,229

UNITED STATES PATENT OFFICE

LEOPOLD LASKA AND ARTHUR ZITSCHER, OF OFFENBACH-ON-THE-MAIN, GERMANY, ASSIGNORS TO GENERAL ANILINE WORKS, INC., OF NEW YORK, N. Y., A CORPORATION OF DELAWARE

AZODYESTUFFS INSOLUBLE IN WATER AND PROCESS OF MAKING SAME

No Drawing. Application filed March 1, 1929, Serial No. 343,841, and in Germany May 7, 1928.

Our present invention relates to new azodyestuffs which are insoluble in water and yield valuable pigment dyes or fast dyeings and printings, when prepared on the vegetable fiber.

They are obtained by combining any diazo, tetrazo or diazoazo compound not containing sulfonic or carboxylic groups with a 2.(2'-hydroxy-3'-naphthoyl-amino)-5-halogen-1.4-dimethoxy-benzene of the general formula

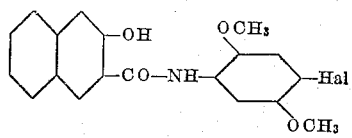

The new dyestuffs show better properties of fastness than those prepared from 2-hydroxy-3-naphthoylaminohydroquinonedimethylether described in U. S. Patent No. 1,457,114. The entrance of a halogen atom into the para position relative to the arylamino group increases the fastness to light of these new dyestuffs in such a degree that the series of these combinations represents a specific group of dyestuffs particularly fast to light among the remarkably fast dyestuffs prepared from the 2-hydroxy-3-naphthoyl-arylides. Some of the new dyestuffs produced by our present invention are also distinguished by a considerable fastness to bucking.

In order to further illustrate our invention the following examples are given, but we wish it to be understood that we are not limited to the particular products nor reaction conditions mentioned therein:

*Example 1.*—14.2 parts of 4-chloro-2-toluidine are diazotized in the usual manner and the diazo solution is combined with a solution of 37.6 parts of 2-(2'-hydroxy-3'-naphthoylamino)-5-chloro-1.4-dimethoxy benzene in a dilute caustic soda solution rinsed with Turkey red oil and an amount of sodium acetate sufficient for binding the excess of the mineral acid. The precipitated dyestuff is filtered off and well washed. It corresponds to the formula:

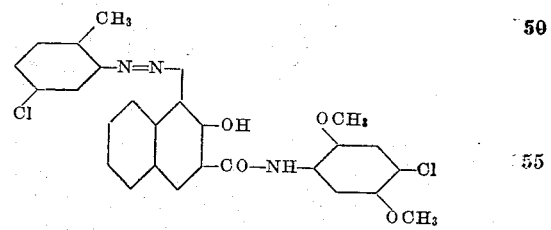

It represents, when dry, a red powder soluble in concentrated sulfuric acid with a wine red tint. It yields, when treated with a substratum, in the usual manner, advantageously in the form of a paste, red lakes of a very good fastness to light.

*Example 2.*—Well boiled and dried cotton yarn is impregnated with a solution containing per liter 4 grs. of 2.(2'-hydroxy-3'-naphthoyl-amino)-5-chloro-1.4-dimethoxy-benzene, 8 cc. of caustic soda solution of 34° Bé. and 10 cc. of Turkey red oil. The yarn, thus treated, is well wrung out and developed with a diazo solution containing per liter 1.62 grs. of 2.5-dichloro-aniline and being neutralized with sodium acetate. The material is rinsed cold and hot and then soaped boiling hot. In this manner an orange brown dyeing of an excellent fastness to light is obtained. The dyestuff thus produced on the fiber corresponds to the formula:

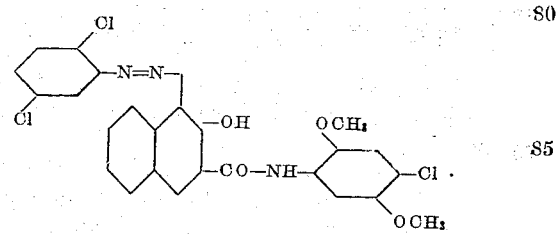

By developing the goods prepared as described above in a diazo solution, which contains per liter 1.42 grs. of 5-chloro-2-aminotoluene and is neutralized with a bicarbonate, a bluish red dyeing is obtained which shows a very good fastness to light and bucking.

*Example 3.*—Cotton yarn previously treated in the appropriate manner is impregnated with a solution containing per liter 3.5 grs. of 2.(2'-hydroxy-3'-naphthoyl-amino)-5-bromo-1.4-dimethoxy benzene, 7 cc. of caustic soda solution of 34° Bé. and 10 cc. of Turkey red oil. The yarn, thus treated, is well hydro-extracted and developed with a diazo solution containing per liter 1.52 grs. of 3-nitro-4-amino-1-toluene and being neutralized with sodium acetate. Then it is rinsed and soaped boiling hot. In this manner a yellowish claret red dyeing of a very good fastness is obtained. The dyestuff thus produced on the fiber corresponds to the formula:

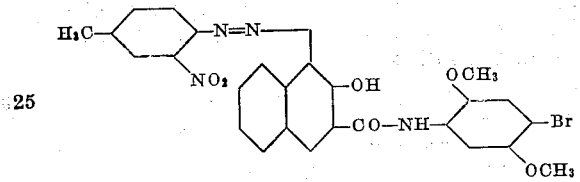

By developing the goods prepared as described above in a diazo solution containing per liter 1.62 grs. or 2.5-dichloro-aniline and being neutralized with sodium acetate dyeings of a copper shade and of a very good fastness are obtained.

With other diazo compounds our process may be carried out in a like manner, for instance, 2.(2'-hydroxy-3'-naphthoyl-amino)-5-chloro-1.4-dimethoxy-benzene yields, when developed with the diazocompounds of the following bases, dyeings of the indicated shades:

| | |
|---|---|
| Meta-xylidine | Bluish red. |
| 3-chloroaniline | Brown orange. |
| 4-chloro-2-toluidine | Red. |
| 4.6-dichloro-1.3-toluidine | Yellowish red. |
| 2.4.5-trichloroaniline | Brownish red. |
| 4-chloro-2-aminodiphenylether | Yellowish red. |
| 5-chloro-2-aminodiphenylether | Full red. |
| 2-nitroaniline | Brownish red. |
| 3-nitroaniline | Reddish orange. |
| 4-chloro-2-nitroaniline | Reddish brown. |
| 2-chloro-4-nitroaniline | Reddish brown. |
| 4-nitro-2-toluidine | Yellowish red. |
| 5-nitro-2-toluidine | Brownish red. |
| 3-nitro-4-toluidine | Reddish brown. |
| 4-nitro-2-anisidine | Yellowish red. |
| 5-nitro-2-anisidine | Brownish claret red. |
| 3-nitro-1.4-anisidine | Bluish garnet. |
| 1-aminoanthraquinone | Reddish brown. |
| o-aminoazotoluene | Bluish garnet. |
| 2-phenetole-azo-α-naphthylamine | Reddish black. |
| Dianisidine | Blackish blue. |

The dyeings obtained according to our process may also be produced by the usual printing processes.

We wish it to be understood that the term "combining" used in the following claims means everywhere combining in substance or on a substratum, especially on the vegetable fiber.

We claim:

1. As new compounds the azo dyestuffs of the general formula:

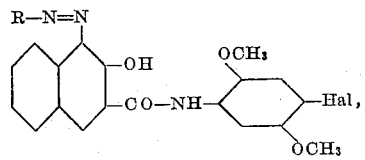

wherein R means an aromatic residue of the benzene, diphenyl, naphthalene or anthracene series not containing sulfonic nor carboxylic groups, which compounds are, when dry, colored powders, insoluble in water, yielding when mixed with substrata valuable color lakes and when prepared on the fiber dyeings and printings of a very good fastness especially to light.

2. As new compounds the azo dyestuffs of the general formula:

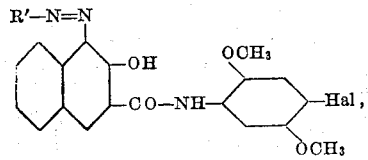

wherein R' means a halogenated residue of the benzene series not containing sulfonic nor carboxylic groups, which compounds are when dry colored powders, insoluble in water, yielding when mixed with substrata valuable color lakes and when prepared on the fiber dyeings and printings of a very good fastness especially to light.

3. As new compounds the azo dyestuffs of the general formula:

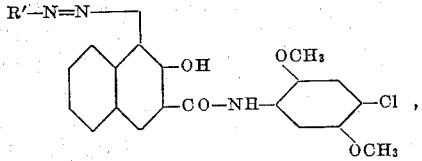

wherein R' means a halogenated residue of the benzene series not containing sulfonic nor carboxylic groups, which compounds are, when dry, colored powders, insoluble in water, yielding when mixed with substrata valuable color lakes and when prepared on the fiber dyeings and printings of a very good fastness especially to light.

4. As a new compound the azo dyestuff of the formula:

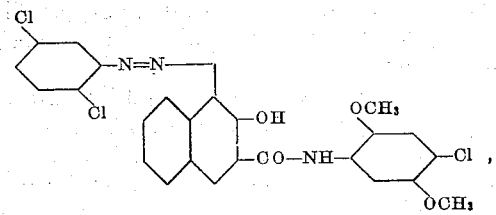

which compound is, when dry, an orange brown powder, insoluble in water, yielding when mixed with a substratum an orange brown color lake and when prepared on the fiber orange brown dyeings and printings of an excellent fastness especially to light.

5. Materials dyed with the dyestuffs of the general formula:

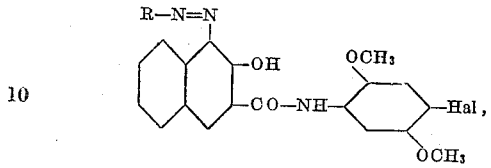

wherein R means an aromatic residue of the benzene, diphenyl, naphthalene or anthracene series not containing sulfonic nor carboxylic groups, which dyed materials show a very good fastness especially to light.

6. Materials dyed with the dyestuffs of the general formula:

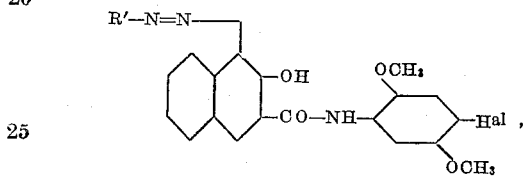

wherein R' means a halogenated residue of the benzene series not containing sulfonic nor carboxylic groups, which dyed materials show a very good fastness especially to light.

7. Materials dyed with the dyestuffs of the general formula:

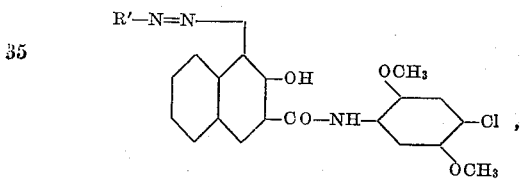

wherein R' means a halogenated residue of the benzene series not containing sulfonic nor carboxylic groups, which dyed materials show a very good fastness especially to light.

8. Materials dyed with the dyestuff of the formula:

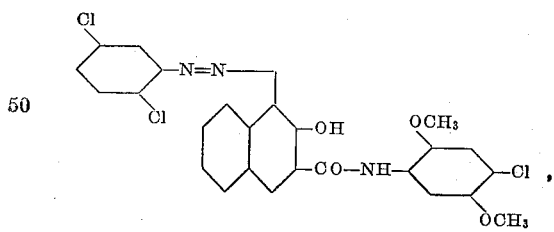

which dyed materials show orange brown shades of an excellent fastness especially to light.

In testimony whereof, we affix our signatures.

LEOPOLD LASKA.
ARTHUR ZITSCHER.